United States Patent
Khalsa

(10) Patent No.: US 10,373,241 B2
(45) Date of Patent: Aug. 6, 2019

(54) PARENTAL CONTROL METHOD AND APPARATUS FOR MEDIA SERVICE SYSTEM

(71) Applicant: INTERDIGITAL CE PATENT HOLDINGS, Paris (FR)

(72) Inventor: Jagjeet Singh Khalsa, San Diego, CA (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 737 days.

(21) Appl. No.: 14/768,721

(22) PCT Filed: Jul. 25, 2013

(86) PCT No.: PCT/US2013/052003
§ 371 (c)(1),
(2) Date: Aug. 18, 2015

(87) PCT Pub. No.: WO2014/143134
PCT Pub. Date: Sep. 18, 2014

(65) Prior Publication Data
US 2015/0379617 A1 Dec. 31, 2015

Related U.S. Application Data

(60) Provisional application No. 61/781,180, filed on Mar. 14, 2013.

(51) Int. Cl.
*G06Q 30/06* (2012.01)
*G06F 21/62* (2013.01)
(Continued)

(52) U.S. Cl.
CPC ......... *G06Q 30/0637* (2013.01); *G06F 21/62* (2013.01); *H04N 21/4227* (2013.01);
(Continued)

(58) Field of Classification Search
CPC ............... G06Q 30/0637; G06F 21/62; G06F 2221/2149; H04N 21/4751; H04N 21/441; H04N 21/4227; H04N 21/47202
(Continued)

(56) References Cited

U.S. PATENT DOCUMENTS

| | | | |
|---|---|---|---|
| 8,356,337 B2 * | 1/2013 | Scott | G06F 21/604 713/168 |
| 8,756,118 B1 * | 6/2014 | Bernshteyn | G06Q 30/0633 705/26.1 |

(Continued)

FOREIGN PATENT DOCUMENTS

| | | | | |
|---|---|---|---|---|
| CN | 101341718 | | 1/2009 | |
| EP | 2462733 A1 * | 6/2012 | | G06F 21/10 |

OTHER PUBLICATIONS

Net.Nanny.pdf. , extracted from Internet , taken from (c) 2007 ContentWatch, Inc. All Rights reserved 2369 West Orton Circle, Salt Lake City, UT 84119.*

(Continued)

Primary Examiner — Yogesh C Garg
(74) Attorney, Agent, or Firm — Jeffrey M. Navon

(57) ABSTRACT

A method and apparatus for parental control of purchases by a child of the parent are described including transmitting a notification to the parent that the child of the parent is attempting to make an online purchase, receiving verification that the parent is authorized to approve the online purchase, transmitting a screen to the parent's receiving device for the parent's approval or disapproval of the purchase and receiving the parent's approval or disapproval. Also described are a method and apparatus for a parent to pre-select online media content purchases of a child of the parent including receiving a request to access a parental control system, receiving verification that the parent is authorized to approve the online purchase, generating and rendering a program guide including media content titles and media content ratings and receiving parental selection of media content approved for purchase by the child.

8 Claims, 7 Drawing Sheets

(51) Int. Cl.
*H04N 21/4227* (2011.01)
*H04N 21/441* (2011.01)
*H04N 21/475* (2011.01)
*H04N 21/472* (2011.01)

(52) U.S. Cl.
CPC ....... *H04N 21/441* (2013.01); *H04N 21/4751* (2013.01); *G06F 2221/2149* (2013.01); *H04N 21/47202* (2013.01)

(58) Field of Classification Search
USPC ...................................................... 705/26.82
See application file for complete search history.

(56) References Cited

U.S. PATENT DOCUMENTS

| | | | |
|---|---|---|---|
| 2003/0061111 A1 | 3/2003 | Dutta et al. | |
| 2006/0155599 A1* | 7/2006 | Chow | G06Q 30/02 705/14.15 |
| 2006/0265427 A1* | 11/2006 | Cohen | G06Q 99/00 |
| 2007/0150918 A1 | 6/2007 | Carpenter et al. | |
| 2007/0180100 A1 | 8/2007 | Biggs et al. | |
| 2007/0212025 A1* | 9/2007 | Barton | G11B 27/105 386/261 |
| 2010/0217837 A1* | 8/2010 | Ansari | G06Q 30/04 709/218 |
| 2011/0035768 A1* | 2/2011 | Ling | G06F 21/10 725/28 |
| 2011/0070876 A1 | 3/2011 | Rogson | |
| 2011/0087595 A1* | 4/2011 | Sabella | G06Q 20/20 705/44 |
| 2012/0276867 A1* | 11/2012 | McNamee | H04L 12/1407 455/406 |
| 2012/0324504 A1 | 12/2012 | Archer et al. | |
| 2013/0227384 A1* | 8/2013 | Good | H04L 67/10 715/205 |
| 2014/0007146 A1* | 1/2014 | Peterson | H04N 21/2543 725/5 |

OTHER PUBLICATIONS

International Search Report for PCT/US2013/052003 dated Oct. 7, 2013.

* cited by examiner

YOUR CHILD "JEAN" WANTS TO WATCH THE TELEVISION SHOW "FRINGE" WHICH IS RATED PG-13

DO YOU APPROVE?

YES  NO

LINDA FROM CALIFORNIA THOUGHT FRINGE IS FOR CHILDREN 10 AND UP

RALPH FROM ILLINOIS THOUGHT FRINGE HAD A LOT OF GORE AND GUNS, NOT APPROPRIATE FOR YOUNG CHILDREN

FIG. 3

| Title | Rating | Jill | Bill |
|---|---|---|---|
| Fringe | PG-13 | | |
| Tron | PG | X | |
| Bambi | G | X | X |
| Sponge Bob Squarepants | G | X | X |
| Evil Dead | PG-13 | | X |

PLEASE APPROVE THE PROGRAMS FOR JILL AND BILL

*FIG. 4*

PARENTAL CONTROL METHOD AND APPARATUS FOR MEDIA SERVICE SYSTEM

This application claims the benefit, under 35 U.S.C. § 365 of International Application PCT/US13/52003, filed Jul. 25, 2013, which was published in accordance with PCT Article 21(2) on Sep. 18, 2014 in English and which claims the benefit of U.S. provisional patent application No. 61/781,180, filed Mar. 14, 2013.

FIELD OF THE INVENTION

The present invention relates in general to parental controls for content delivered by a media service.

BACKGROUND OF THE INVENTION

In multicast and broadcast applications, data is transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

A parent gets better information about media programming that a child wants to consume, when the parent can control in real-time what programming (content) the child gets to watch/playback. This is better than using passive methods such as the V-Chip or related methods, which are passive parental controls. A V-chip sets a specific rating for the programming (content) that a child can watch in advance. That, is a V-chip relies on the rating of the program and compares the program (content) rating that the parent specified in advance to what is about to be aired (broadcast/multicast) and permits or disallows the rendering (viewing) by a child on the display device. V-chip technology works much like closed captioning and uses the vertical blanking interval in the television signal. The system receives a special code in the broadcast/multicast signal which indicates the show's score according to a simple numerical rating system for violence, sex, and language. The programs' signals are encoded according to their rating, on line 21 of the broadcast signal's vertical blanking interval using the XDS protocol, and this is detected by the television set's V-chip. If the program rating is outside the level configured as acceptable on that particular television the program is blocked. The V-chip does not block news or sports casts as this sort of programming does not have ratings.

SUMMARY OF THE INVENTION

The present invention provides a parent with the ability to approve or disapprove the content that their child can watch when the programming comes through a media service such as M-Go™ (Trademark of Technicolor) or Netflix™ (Trademark of Neflix).

A method and apparatus for parental control of purchases by a child of the parent are described including transmitting a notification to the parent that the child of the parent is attempting to make an online purchase, receiving verification that the parent is authorized to approve the online purchase, transmitting a screen to the parent's receiving device for the parent's approval or disapproval of the purchase and receiving the parent's approval or disapproval.

Also described are a method and apparatus for a parent to pre-select online media content purchases of a child of the parent including receiving a request to access a parental control system, receiving verification that the parent is authorized to approve the online purchase, generating and rendering a program guide including media content titles and media content ratings and receiving parental selection of media content approved for purchase by the child.

BRIEF DESCRIPTION OF THE DRAWINGS

The present invention is best understood from the following detailed description when read in conjunction with the accompanying drawings. The drawings include the following figures briefly described below:

FIG. 3 is an alternative expanded display delivered to a parent (or guardian or responsible person) for parental approval/disapproval of content (programming) that could be delivered to a child, the alternative expanded display including display of other parental reviews upon which the parent can base their decision in accordance with the principles of the present invention.

FIG. 4 is another alternative expanded display delivered to a parent (or guardian or responsible person) for parental approval/disapproval of content (programming) for managing viewing content for multiple children in accordance with the principles of the present invention.

DETAILED DESCRIPTION OF THE PREFERRED EMBODIMENTS

Figure 1:
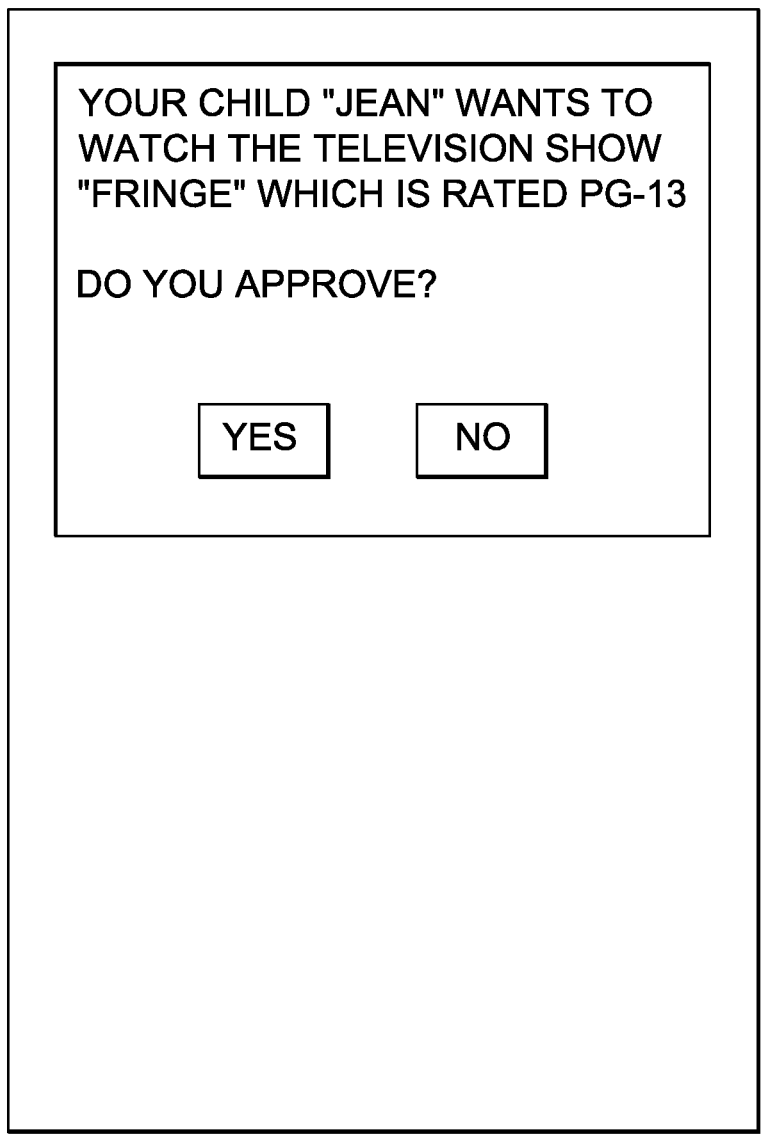
FIG. 1 is a basic display delivered to a parent (or guardian or responsible person) for parental approval/disapproval of content (programming) that could be delivered to a child in accordance with the principles of the present invention.

The present invention provides a user interface and notification element where a parent (as a user) approves the purchases that their child(ren) make(s). This can be for any online purchases. Purchases made when using a media delivery service such as M-Go or Netflix are used as examples. That is, a child will have a profile which is geared towards a particular rating such as G, PG, PG-13, R, etc. When the child selects a program to watch through the media delivery service, a message is sent to a parent using a device such as a phone, television, and the like, which asks whether or not the parent approves of the programming selection. Based on the approval of the parent, (yes/no) the playback (rendering) of the program (content) will occur or not. This can be a simple display of the rating itself as shown in FIG. 1.

Figure 2:
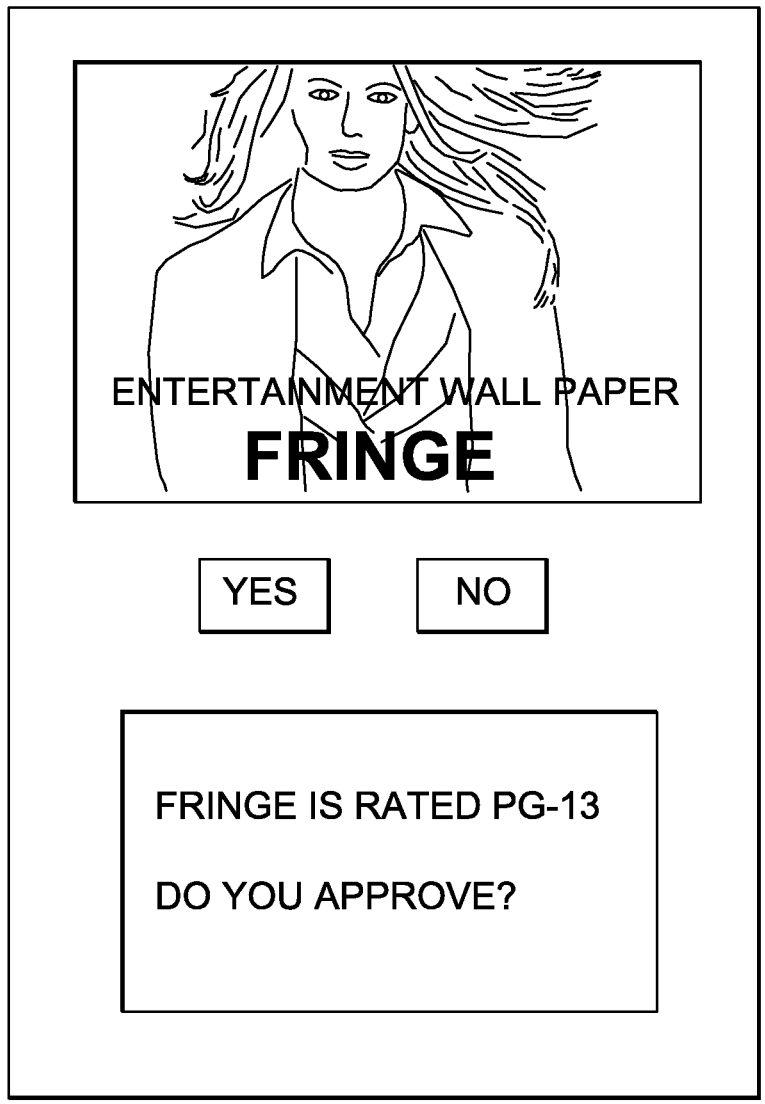
FIG. 2 is an expanded display delivered to a parent (or guardian or responsible person) for parental approval/disapproval of content (programming) that could be delivered to a child including display of a trailer upon which the parent can base their decision in accordance with the principles of the present invention.

In terms of the playback (rendering) of the program (content), a parent may want to know more about a program than the rating of the selected program. For example, when a parent is asked about whether or not they approve of the selection, a trailer of the program can be presented to the parent that shows whether or not the program would be appropriate for a child as shown in FIG. 2.

A parent can also be presented with an option where instead of viewing what the movie/television studio wants the parent to see for a trailer, a ratings service which takes into account the comments of parents can be used for gauging whether or not a program would be a proper for a child. That is, parents, after a show is televised, can give comments for other parents whether or not a program would be good for a child. These ratings can be text, numeric ratings, and the like, which can be presented in a form of a social networking service, message board, graphical representation, icons, and the like. Hence, when a parent wants to know whether or not a program is appropriate, the feedback the parent gets corresponds to what other parents have said: "Parent X thought the show was appropriate for 5 year olds", "The show is too violent", etc. These comments would be shown in the mobile device/television which the parent uses to approve/reject a child's programming selections based on the recommendations made by others FIG. 3

The principles described herein can also be used to have a parent specify a specific list of programming "a menu" which has been pre-approved by the parent. Such a list can be generated by a user preselecting content from an electronic program guide, results of a search, general program listing, and the like, where a user approves/disapproves of programming ahead of time. The parent can also specify that some programs are appropriate for one child while other programs are appropriate for a second child as shown in FIG. 4.

These permission communications can be done at a point of a consumer electronics device, a media service, and the like. Such devices include but are not limited to a dual mode smart phone, a desktop computer, a laptop computer, an iPhone, an iPad, an iPod, a tablet computing device or the like.

Parent and child(ren) here are used as examples. Parent could include any person responsible for the child. In fact, the present invention is not limited to parents (responsible persons) and child(ren). For example, the control method and system of the present invention could be used in places where certain content is "forbidden" for other reasons such as religion. The military, for example, may want or need to control content available to subordinate military personnel such as content of a pornographic nature because it would be forbidden under Islamic religious strictures or rules. In the United States such control would amount to censorship and an abridgment of First Amendment rights but as "guest" in an Islamic country, it may be necessary and expedient.

Figure 5:
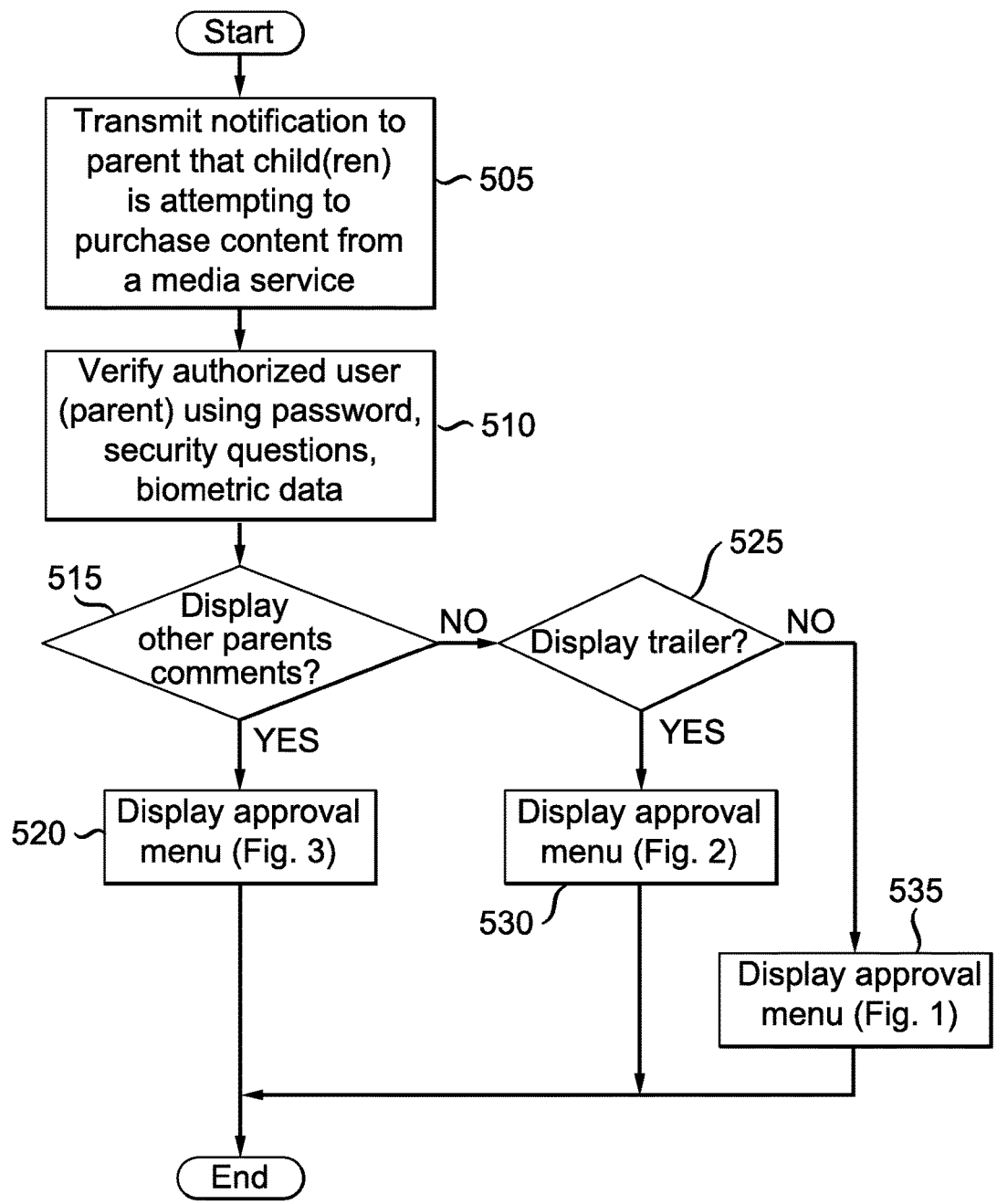
FIG. 5 is a flowchart of an exemplary embodiment of the present invention in which the user is notified of attempt purchase of content (a program) from a media service.

FIG. 5 is a flowchart of an exemplary embodiment of the present invention in which the user is notified of an attempt to purchase content (a program) from a media service. At 505 the parental control system of a media service transmits a notification to a parent on their preselected notification medium responsive to receiving a request to purchase content (a program) from the media service. If the parent or authorized user cannot respond to the notification within a predetermined amount of time, then the child(ren)'s request to purchase is denied. At 510 the parental control system of the media service verifies that the user wishing to access the parental control system of the media service is an authorized user as opposed to, for example, a child trying to compromise the parental control system. Verification can be by any number of means such as password, security questions, biometric data or the like. Biometric data may include fingerprints, retina scans or any other biometric data. At 515, the parental control system of the media service asks the authorized user (parent) if the parent wants to display other parents' comments in order to help make an approval/disapproval decision. If the authorized user wants to display other parents' comments in order to help make an approval/disapproval decision then at 520, a screen like that shown in FIG. 3 is generated and displayed by the parental control system of the media service. If the authorized user does not want to display other parents' comments in order to help make an approval/disapproval decision then at 525 asks the authorized user (parent) if the parent wants to display the content (program) trailer in order to help make an approval/disapproval decision. If the authorized user (parent) wants the content (program) trailer displayed in order to help make an approval/disapproval decision then at 530 a screen like that shown in FIG. 2 is generated and displayed by the parental control system of the media service. If the authorized user (parent) does not want the content (program) trailer displayed in order to help make an approval/disapproval decision then at 550 a screen like that shown in FIG. 1 is generated and displayed by the parental control system of the media service. The generation and display of the screens also implies that the media service parental control system receives and processes the authorized user's responses (input).

Figure 6:
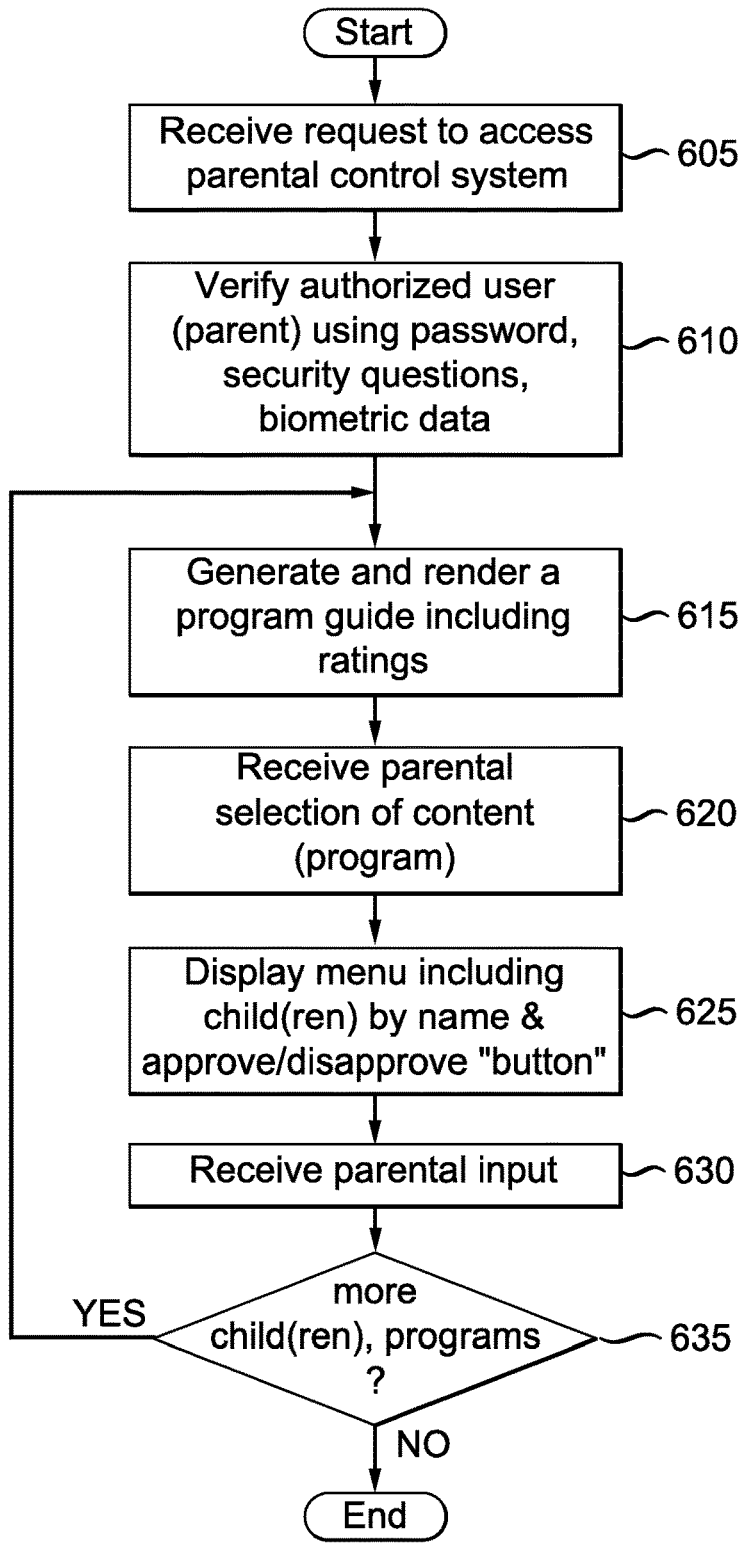
FIG. 6 is a flowchart of an exemplary embodiment of the present invention in which the user requests access to the parental control system to preselect content (programs) for approval/disapproval from a media service.

FIG. 6 is a flowchart of an exemplary embodiment of the present invention in which the user requests access to the parental control system to preselect content (programs) for approval/disapproval from a media service. At 605 the media service parental control system receives a request to access the parental control system. At 610 the parental control system of the media service verifies that the user wishing to access the parental control system of the media service is an authorized user as opposed to, for example, a child trying to compromise the parental control system. Verification can be by any number of means such as password, security questions, biometric data or the like. At 615 the media service parental control system generates and renders an electronic program guide including ratings. At 620 the media service parental control system receives parental selection of content (program) from the authorized user. At 625 a menu is generated and displayed (rendered) displaying the child(ren) by name and an approval/disapproval selection means such as a "radio button". At 630, the media service parental control system receives authorized user input. At 635 the media service parental control system asks the authorized user if the authorized user wants to continue with more programs or more children. If the authorized user wants to continue with more programs or more children, then processing proceeds to 615. If authorized user wants to continue with more programs or more children then processing ends.

Figure 7:
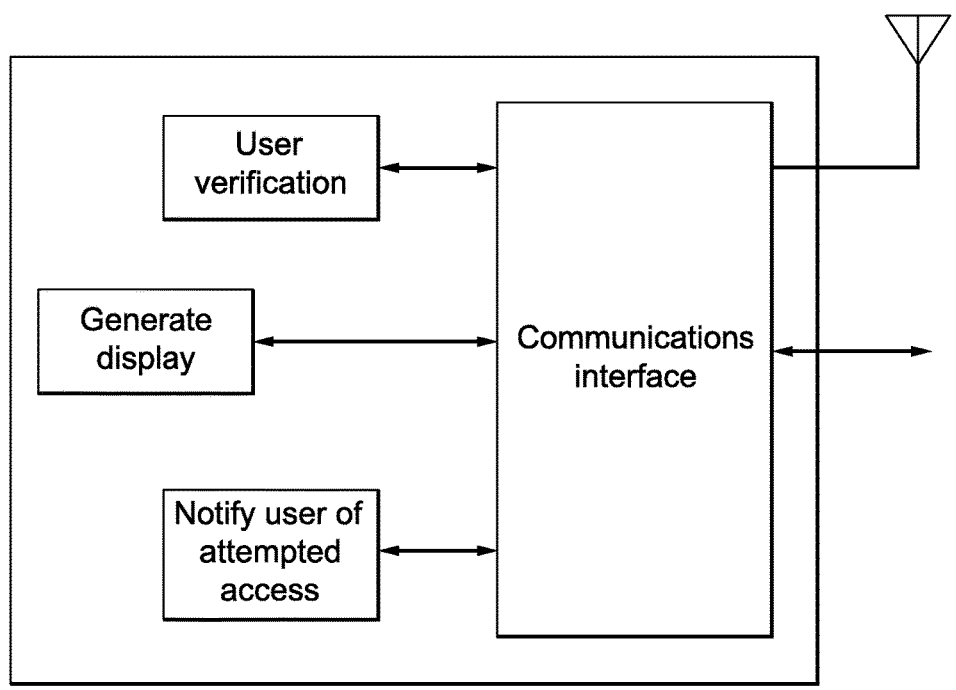
FIG. 7 is a block diagram of an exemplary embodiment of the present invention in accordance with the principles of the present invention.

FIG. 7 is a block diagram of an exemplary embodiment of the present invention in accordance with the principles of the present invention. The parental control system of the media service of the present invention includes a communications interface which may be connected to one or more antennas. The parental control system of the media service of the present invention also includes a user verification module, a generate display module and a notification module, all in bi-directional communication with the communications interface. The user verification module performs user verification using passwords, security questions and/or biometric data. The generate display module receives authorized user input and based on the received authorized user input generates an appropriate display screen and solicits and processes user input based on the displayed screen. This may include the display of confirmation screens. The notification module notifies a user to the user's preselected notification device when their child(ren) attempt to purchase content (programs) from the media service. As used above the parental control system can be extended to be a control system such as could be used in military situations as explained above.

It is to be understood that the present invention may be implemented in various forms of hardware, software, firmware, special purpose processors, or a combination thereof. Special purpose processors may include application specific integrated circuits (ASICs), reduced instruction set computers (RISCs) and/or field programmable gate arrays (FPGAs). Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for control of purchases by first person responsible for a second person, said method comprising, at a parental control system:
   transmitting a notification to a computing device of said first person that said second person is attempting to make an online purchase from a media delivery service;
   receiving verification that said first person is authorized to approve said online purchase;
   transmitting a screen to said first person's computing device for said first person's approval or disapproval of said purchase;
   receiving said first person's approval or disapproval, wherein said screen posts a query to said computing device of said first person to determine if said first person wants to review comments of other authorized users' on said attempted online purchase;
   receiving said first person's response to said query; and
   transmitting, to the first person's computing device, a supplemental screen displayable on a display of the first person's computing device, including said other authorized users' comments on said attempted online purchase responsive to said first person's response to said query; and
   receiving said first person's approval or disapproval based on information in said supplemental screen.

2. The method according to claim 1, wherein said verification is via one of a password, security questions and biometric data.

3. The method according to claim 1, wherein said attempted online purchase is media content.

4. The method according to claim 1, wherein, when said first person's response to said query is negative, a supplemental query is transmitted to said computing device of said first person to determine if said first person wants to review trailer for media content that said second person is attempting to purchase online and the method further comprises:
   receiving said first person's response to said supplemental query; and
   transmitting a further supplemental screen, displayable on the first person's computing device, including said trailer for said media content of said attempted online purchase responsive to said first person's response to said supplemental query; and
   receiving said first person's approval or disapproval based on information in said further supplemental screen.

5. An apparatus for control of purchases by first person responsible for a second person, comprising:
   a communications interface configured for:
      transmitting a notification to said first person that said second person is attempting to make an online purchase from a media delivery service;
      receiving verification that said first person is authorized to approve said online purchase;
      transmitting a screen to said first person's receiving device for said first person's approval or disapproval of said purchase;
      receiving said first person's approval or disapproval;
   a generate display module configured for posting a query on a screen to said first person to determine if said first person wants to review other authorized users' comments on said attempted online purchase, said generate display module being in bi-directional communication with said communications interface; and
   wherein said communications interface is further configured for:
      receiving said first person's response to said query;
      transmitting a supplemental screen including said other authorized users' comments on said attempted online purchase responsive to said first person's response to said query; and
      receiving said first person's approval or disapproval based on information in said supplemental screen.

6. The apparatus according to claim 5, wherein said verification is via one of a password, security questions and biometric data.

7. The apparatus according to claim 5, wherein said attempted online purchase is media content.

8. The apparatus according to claim 5, wherein, when said first person's response to said query is negative, a supplemental query is transmitted to said first person to determine if said first person wants to review trailer for media content that said second person is attempting to purchase online and said communications interface is further configured for:
   receiving said first person's response to said supplemental query; and
   transmitting a further supplemental screen including said trailer for said media content of said attempted online purchase responsive to said first person's response to said supplemental query; and receiving said first person's approval or disapproval based on information in said further supplemental screen.

* * * * *